March 31, 1942.    C. L. CONNERS    2,277,958
WEIGHING SCALE
Filed Nov. 29, 1939    2 Sheets-Sheet 1
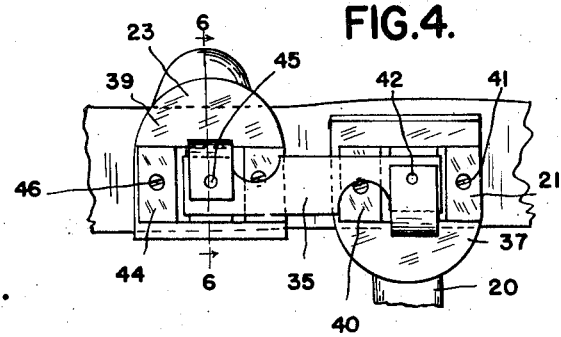
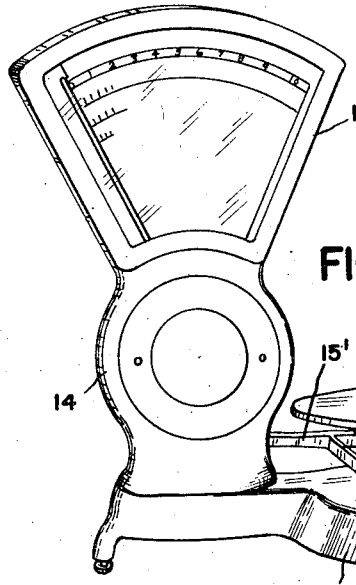
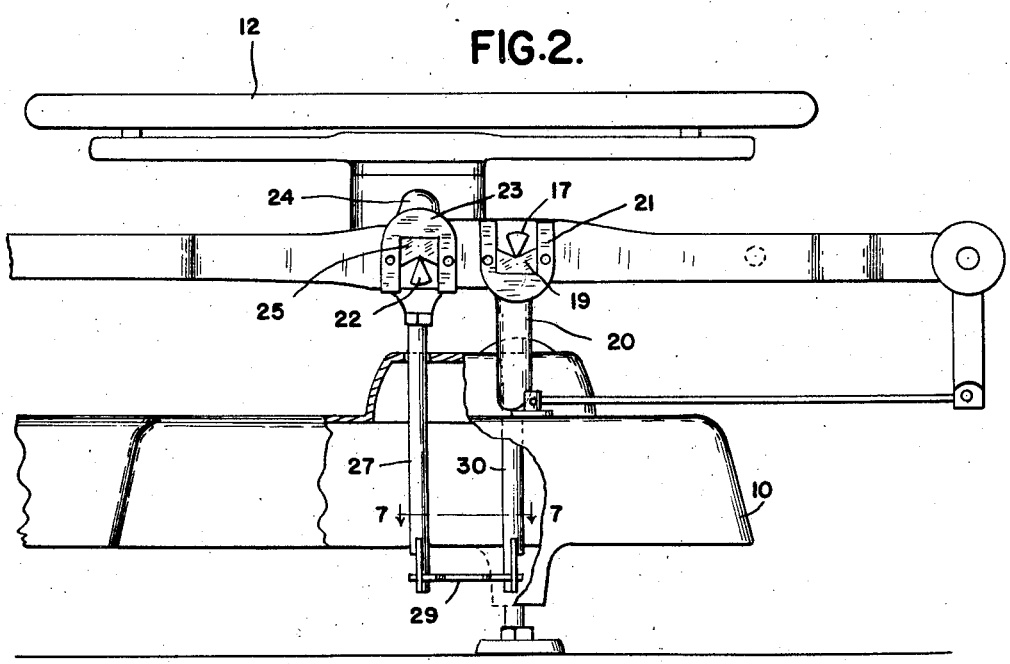
INVENTOR.
CARL L. CONNERS
BY
ATTORNEYS March 31, 1942.   C. L. CONNERS   2,277,958
WEIGHING SCALE
Filed Nov. 29, 1939   2 Sheets-Sheet 2

INVENTOR.
CARL L. CONNERS
BY
ATTORNEYS

Patented Mar. 31, 1942

2,277,958

UNITED STATES PATENT OFFICE 2,277,958

WEIGHING SCALE

Carl L. Conners, Louisville, Ky., assignor to Walter F. Stimpson, Louisville, Ky.

Application November 29, 1939, Serial No. 306,722

2 Claims. (Cl. 265—27)

This invention relates to weighing scales, and particularly to improved means for controlling the operative movements of certain parts of the mechanism which, under unusual operating conditions, have been apt to become disaligned and thereby to cause inaccuracies in the operation of the scale.

In weighing scales of that variety wherein the platform is supported at only two points, while special check means is provided to prevent the platform from tilting upon its supports, difficulty has been encountered in maintaining extreme accuracy of the weighing mechanism when the loads are applied to the platform in such manner that most of the weight is imposed at one of the edges farthest from the bearings, whereby strong rocking effort is applied to the platform. Such a scale may weigh accurately when the load is approximately centered upon the platform, but considerable error may be created by placing the load at such an extreme edge of the platform. I have determined that the principal cause of such errors is the increased lateral effort at the bearings which results from this type of loading. This causes a slight shifting between the pivots and bearing blocks at the main bearings which support the platform upon the main lever. The object of the invention may therefore be summarized as comprising the provisions of simple, inexpensive, rugged and permanently effective means for absorbing such lateral effort resulting from uneven loading, and for eliminating the aforementioned shifting at the bearings, thereby maintaining extreme accuracy of the scale regardless of the position of the load upon the platform. A further object is to provide such means which is, further, of such character that it imposes very little friction, and does not interfere in any manner with operation or use of the scale.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of a fan-type pendulum weighing scale incorporating the present invention.

Figure 2 is a fragmentary front elevational view of the bearing portions of the scale, showing the arrangement of my improved controlling means for preventing shifting at the bearings due to unbalanced loading of the platform, a portion of the frame being broken away to afford a better view of the check mechanism.

Figure 4 is an enlarged front elevational view of one of the control links.

Figure 3:
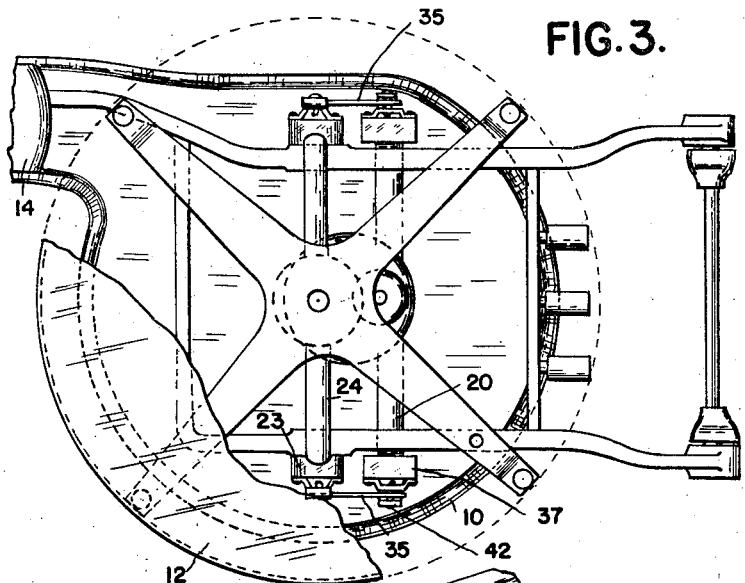
Figure 3 is a plan view of such portions of the scale, with the platform partly broken away.
Figure 5:
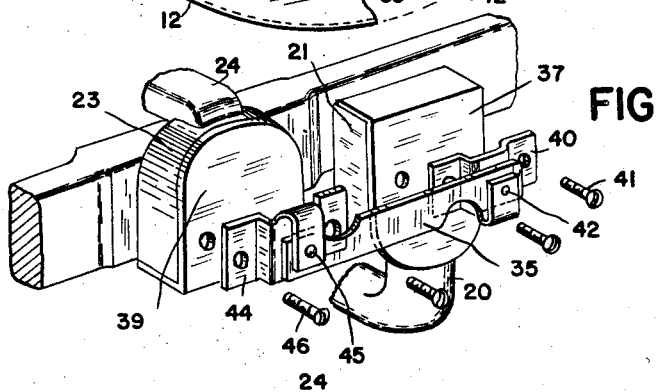
Figure 5 is an exploded perspective view showing the control link and adjacent portions of the scale.
Figures 6, 7:
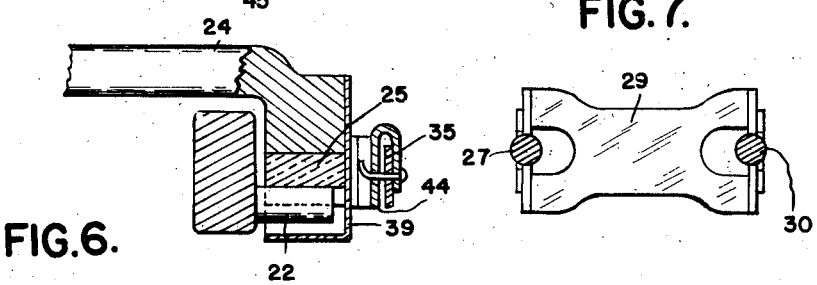
Figure 6 is a sectional view taken substantially on the line 6—6 of Figure 4 and looking in the direction of the arrows.
Figure 7 is a sectional view taken substantially on the line 7—7 of Figure 2 and looking in the direction of the arrows.

Referring now to the drawings, reference character 10 designates the frame of a weighing scale, incorporating the present invention. While the invention is readily applicable to scales of varying types, as will be appreciated by those skilled in the art, the illustrated scale is provided at one end with a platform 12, and at the outer end with a pendulum housing 14 and a chart housing 15 supported thereby, these parts respectively containing the load counterbalancing and the weight indicating means, the details of construction of which, inasmuch as they form no part of the present invention, need not be considered, further than to say that they may be of the usual or any suitable variety.

Loading of the platform influences the load counterbalancing and weight indicating means through the agency of a main lever 15' mounted, as by means of knife edge pivots 17, in fixed bearing blocks 19 supported upon the base as by standards 20. Additional knife edge pivots 22, also carried by the main lever, support the platform 12, which is provided with laterally projecting arms 24 carrying bearing blocks 25, which rest upon the knife pivots 22. To prevent the platform from tilting, a rod 27 rigidly attached thereto projects downwardly into the base, its lower extremity being articulated to a check link 29, the other end of which is pivoted to a fixed post 30. The link corresponds in length and is parallel in position to a line drawn between the knife-edge pivots 17—22. This check mechanism will be recognized as of a well-known character now in use, which needs no further description.

The bearings will be seen to be arranged in pairs at the front and back of the scale, each pair consisting of one fixed supporting bearing and one movable platform bearing.

To prevent lateral shifting at these bearings, due to the placing of the load upon either the extreme right or the extreme left edge of the platform (as viewed in Figure 2), I provide control links 35, connecting the rocking centers of the pivots 17—22 and tying each of the bearings 25 against movement toward or from the adjacent bearing 19. These links take the reaction of any effort tending so to move the bearings laterally with respect to each other. It will be seen that similar link assemblies are employed at the front bearings and at the back bearings of the scale, so that detailed description of one such link assembly will suffice.

Each of the bearing supports 20 terminates in an enlarged housing 21 for the bearing block 19, while each of the arms 24 terminates in an enlarged housing section 23 for the bearing block 25. A cover 37 carried by the portion 21 conceals the pivot and bearing portions 17—19, while a similar cover 39 conceals the pivot and bearing portions 22, 25. The screws 41 which serve to attach the cover 37 also retain a bracket 40 to which the link 35 is pivoted, upon a pin 42. The axis of pin 42 is aligned with the knife edge of pivot 17. A corresponding bracket 44 is similarly positioned upon the bearing casing 23 by means of the screws 46 which also secure the bearing cap 39. A pin 45 carried by bracket 44 serves as the pivotal support for the link at this end, the pivot axis being aligned with the knife edge of pivot 22. The effective length of the link corresponds to the distance between the pivots 17—22, and since one such link is provided at the front of the scale and another at the rear, the position of the bearing block 25 will be seen to be effectively located at all times. Any lateral forces resulting from loading the platform near one of the edges remote from the bearing edges are taken by the links 35, so that the bearings 25, being unable to shift, remain accurately aligned with their pivots, and true and proper weighing is insured at all times and regardless of the position of the load.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

I claim:

1. In a weighing scale, in combination with a support, fixed bearing means carried thereby, a main lever fulcrummed in said bearing means, additional platform supporting bearing means carried by said lever in spaced parallel relation to the first mentioned bearing means, a platform mounted upon said last mentioned bearing means, check means for preventing unwanted tilting of the platform, each of said bearing means comprising a bearing block and a knife-edge pivot resting therein, and supplemental check means comprising a pair of links swingable at their ends substantially coaxially with said bearing means and tying said platform and lever bearing means against lateral movement with respect to each other, each of said bearing means being formed in two spaced coaxial sections, one fixed bearing section being arranged adjacent each platform-supporting bearing section, whereby two pairs of cooperating bearing sections are formed, one of said pairs being arranged near the front and the other near the back of the platform, removable cover means enclosing each of said bearing sections, and supplemental pivot means for said pair of links carried upon the outside of each of the cover means and axially aligned with the pivot axis of the bearing section therewithin.

2. In combination with means as set forth in claim 1, common securing means for positioning said cover means and said supplemental pivot means.

CARL L. CONNERS.